United States Patent
Holden et al.

(10) Patent No.: US 12,198,237 B2
(45) Date of Patent: Jan. 14, 2025

(54) DYNAMIC DATA TILING

(71) Applicant: Indigo Ag, Inc., Boston, MA (US)

(72) Inventors: Christopher Edward Holden, Jamaica Plain, MA (US); Keith Frederick Ma, Cambridge, MA (US); Jacob Samuel McDonald, Malden, MA (US)

(73) Assignee: INDIGO AG, INC., Charlestown, MA (US)

( * ) Notice: Subject to any disclaimer, the term of this patent is extended or adjusted under 35 U.S.C. 154(b) by 48 days.

(21) Appl. No.: 18/051,789

(22) Filed: Nov. 1, 2022

(65) Prior Publication Data

US 2023/0092057 A1    Mar. 23, 2023

Related U.S. Application Data

(63) Continuation of application No. PCT/US2021/030196, filed on Apr. 30, 2021.

(60) Provisional application No. 63/074,319, filed on Sep. 3, 2020, provisional application No. 63/019,071, filed on May 1, 2020.

(51) Int. Cl.
    *G06T 11/40*     (2006.01)
    *G06F 16/587*    (2019.01)

(52) U.S. Cl.
    CPC ............ *G06T 11/40* (2013.01); *G06F 16/587* (2019.01)

(58) Field of Classification Search
    None
    See application file for complete search history.

(56) References Cited

U.S. PATENT DOCUMENTS

| 6,422,508 B1 | 7/2002 | Barnes |
| 7,212,670 B1 | 5/2007 | Rousselle et al. |
| 7,675,549 B1 | 3/2010 | Brower et al. |

(Continued)

FOREIGN PATENT DOCUMENTS

| AU | 2012101249 A4 | 9/2012 |
| CN | 109360117 A   | 2/2019 |

(Continued)

OTHER PUBLICATIONS

Becker-Reshef, I. et al., "Prior Season Crop Type Masks for Winter Wheat Yield Forecasting: A US Case Study," Remote Sensing, 10: 1659, Oct. 19, 2018, pp. 1-20.

(Continued)

*Primary Examiner* — Frank S Chen
(74) *Attorney, Agent, or Firm* — Fenwick & West LLP

(57) ABSTRACT

Dynamic data tiling is provided. In various embodiments, a request is received for a tile of geographic data from a requestor. The request specifies a region relative to a projection. The region is looked up in a spatial index to determine one or more source tiles. The spatial index corresponds to the projection and the one or more source tiles intersecting the region. The one or more source tiles are requested from a proxy. The proxy is configured to maintain one or more persistent connections to one or more datastores and to retrieve the one or more source tiles via the one or more persistent connections. The one or more source tiles is received from the proxy. The requested tile of geographic data is constructed from the one or more source tiles. The requested tile of geographic data is provided to the requestor.

27 Claims, 13 Drawing Sheets

(56) References Cited

U.S. PATENT DOCUMENTS

| | | | |
|---|---|---|---|
| 8,965,812 B2 | 2/2015 | Linville | |
| 9,113,590 B2 | 8/2015 | Johnson | |
| 9,381,646 B1 | 7/2016 | Fryshman | |
| 9,489,576 B2 | 11/2016 | Johnson et al. | |
| 9,519,861 B1 | 12/2016 | Gates et al. | |
| 9,563,945 B2 | 2/2017 | Fryshman | |
| 9,582,002 B2 | 2/2017 | Cavender-Bares | |
| 9,582,873 B2 | 2/2017 | Ulman | |
| 9,629,306 B2 | 4/2017 | Sauder et al. | |
| 9,658,201 B2 | 5/2017 | Redden et al. | |
| 9,745,060 B2 | 8/2017 | O'Connor et al. | |
| 9,756,844 B2 | 9/2017 | Groeneveld | |
| 9,880,140 B2 | 1/2018 | Osborne et al. | |
| 9,928,578 B1 | 3/2018 | Chartrand et al. | |
| RE46,968 E | 7/2018 | Linville | |
| 10,445,877 B2 | 10/2019 | Albrecht et al. | |
| RE47,742 E | 11/2019 | Linville | |
| 10,564,316 B2 | 2/2020 | Xu et al. | |
| 10,902,655 B1* | 1/2021 | Snyder | G06F 16/24552 |
| 11,100,579 B1 | 8/2021 | Raguse et al. | |
| 11,762,125 B2 | 9/2023 | Xu et al. | |
| 11,978,251 B2 | 5/2024 | Melaas et al. | |
| 2003/0019408 A1 | 1/2003 | Fraisse et al. | |
| 2005/0234691 A1 | 10/2005 | Singh et al. | |
| 2007/0014488 A1 | 1/2007 | Chen et al. | |
| 2007/0229524 A1 | 10/2007 | Hendrey et al. | |
| 2008/0174593 A1 | 7/2008 | Ham et al. | |
| 2009/0037441 A1 | 2/2009 | Howell et al. | |
| 2009/0259709 A1 | 10/2009 | Nilkitin | |
| 2010/0082564 A1* | 4/2010 | Fernekes | G06F 16/29 707/705 |
| 2010/0321399 A1 | 12/2010 | Ellren et al. | |
| 2010/0332430 A1 | 12/2010 | Caraviello et al. | |
| 2012/0143504 A1* | 6/2012 | Kalai | H04L 67/025 701/533 |
| 2012/0191773 A1 | 7/2012 | Appleton | |
| 2013/0332205 A1 | 12/2013 | Friedberg et al. | |
| 2014/0039967 A1 | 2/2014 | Scharf et al. | |
| 2014/0095261 A1 | 4/2014 | Johnson | |
| 2014/0222374 A1 | 8/2014 | Lock et al. | |
| 2014/0263822 A1 | 9/2014 | Malveaux | |
| 2016/0050840 A1 | 2/2016 | Sauder et al. | |
| 2016/0071410 A1 | 3/2016 | Rupp et al. | |
| 2016/0073573 A1 | 3/2016 | Ethington et al. | |
| 2016/0157414 A1 | 6/2016 | Ackerman et al. | |
| 2016/0171680 A1 | 6/2016 | Lobell | |
| 2016/0180473 A1 | 6/2016 | Groeneveld | |
| 2016/0216245 A1 | 7/2016 | Sutton | |
| 2016/0232621 A1 | 8/2016 | Ethington et al. | |
| 2016/0302351 A1 | 10/2016 | Schildroth et al. | |
| 2016/0309646 A1 | 10/2016 | Starr et al. | |
| 2017/0041407 A1 | 2/2017 | Wilbur et al. | |
| 2017/0083747 A1 | 3/2017 | Guan et al. | |
| 2017/0089761 A1 | 3/2017 | McQuilkin et al. | |
| 2017/0090068 A1 | 3/2017 | Xiang et al. | |
| 2017/0105335 A1 | 4/2017 | Xu et al. | |
| 2017/0109395 A1 | 4/2017 | Farah | |
| 2017/0112043 A1 | 4/2017 | Nair et al. | |
| 2017/0124463 A1 | 5/2017 | Chen et al. | |
| 2017/0161627 A1 | 6/2017 | Xu et al. | |
| 2017/0168157 A1 | 6/2017 | Hagerman et al. | |
| 2017/0169523 A1 | 6/2017 | Xu et al. | |
| 2017/0177938 A1 | 6/2017 | Papanikolopoulos et al. | |
| 2017/0196171 A1 | 7/2017 | Xu et al. | |
| 2017/0199528 A1 | 7/2017 | Detweiler et al. | |
| 2017/0206415 A1 | 7/2017 | Redden | |
| 2017/0213141 A1 | 7/2017 | Xu et al. | |
| 2017/0228475 A1 | 8/2017 | Aldor-Noiman et al. | |
| 2017/0231213 A1 | 8/2017 | Gordon et al. | |
| 2017/0257426 A1 | 9/2017 | Wilbur et al. | |
| 2017/0258005 A1 | 9/2017 | Cutter | |
| 2017/0270446 A1 | 9/2017 | Starr et al. | |
| 2017/0287436 A1* | 10/2017 | Korzunov | G09G 5/006 |
| 2017/0287437 A1* | 10/2017 | Korzunov | G06F 3/14 |
| 2018/0049043 A1 | 2/2018 | Hoffberg | |
| 2018/0070527 A1 | 3/2018 | Richt | |
| 2018/0075545 A1 | 3/2018 | Richt | |
| 2018/0137675 A1* | 5/2018 | Kwant | G06T 17/05 |
| 2018/0211156 A1 | 7/2018 | Guan et al. | |
| 2019/0019008 A1 | 1/2019 | Guan et al. | |
| 2019/0050948 A1 | 2/2019 | Perry et al. | |
| 2020/0008371 A1 | 1/2020 | Hassanzadeh et al. | |
| 2022/0067614 A1 | 3/2022 | Guan et al. | |
| 2022/0138767 A1 | 5/2022 | Ashtekar et al. | |
| 2022/0180526 A1 | 6/2022 | Braswell et al. | |
| 2022/0210987 A1 | 7/2022 | Baldo | |
| 2022/0215659 A1 | 7/2022 | Melaas et al. | |
| 2022/0237888 A1 | 7/2022 | Mohite et al. | |
| 2022/0261928 A1 | 8/2022 | Malizia et al. | |
| 2022/0342536 A1 | 10/2022 | Bontjes | |
| 2022/0343229 A1 | 10/2022 | Gruber et al. | |
| 2023/0092057 A1 | 3/2023 | Holden et al. | |

FOREIGN PATENT DOCUMENTS

| | | |
|---|---|---|
| CN | 109685081 A | 4/2019 |
| CN | 106529451 B | 6/2019 |
| CN | 110287869 A | 9/2019 |
| CN | 110909679 A | 3/2020 |
| CN | 108764688 B | 11/2021 |
| KR | 10-1703442 B1 | 2/2017 |
| WO | WO 2020/055950 A1 | 3/2020 |
| WO | WO-2021/007352 A1 | 1/2021 |
| WO | WO 2021/041666 A1 | 3/2021 |
| WO | WO 2021/062147 A1 | 4/2021 |
| WO | WO 2021/062177 A1 | 4/2021 |
| WO | WO-2021/007352 A8 | 8/2021 |
| WO | WO-2021/222763 A1 | 11/2021 |
| WO | WO 2022/020448 A1 | 1/2022 |

OTHER PUBLICATIONS

Bermudez, C., "Development of a remote sensing protocol for inventorying cover crop adoptions," Iowa State University Master of Science Thesis, 2016, pp. 1-80.

Bratten, J., "Landsatlinkr 0.1.4 User Guide," Guide version 0.1.4a draft, Mar. 5, 2015, pp. 1-42.

European Patent Office, Extended European Search Report, EP Patent Application No. 21796375.0, Dec. 19, 2023, nine pages.

European Patent Office, Extended European Search Report, EP Patent Application No. 20836088.3, Jun. 14, 2023, ten pages.

Gao, F. et al., "A within-season approach for detecting early growth stages in corn and soybean using high temporal and spatial resolution imagery," Remote Sens Environ, vol. 242: 111752, Mar. 2020, pp. 1-19.

Kuzyakova, I.F. et al., "Time series analysis and mixed models for studying the dynamics of net N mineralization in a soil catena at Gondelsheim (S-W Germany)," Geoderma, vol. 136, Sep. 7, 2006, pp. 803-818.

PCT International Search Report and Written Opinion, PCT Application No. PCT/US2021/042542, Oct. 24, 2021, nine pages.

PCT International Search Report and Written Opinion, PCT International Application No. PCT/US2020/041256, Oct. 5, 2020, 13 pages.

PCT International Search Report and Written Opinion, PCT International Application No. PCT/US2020/048188, Nov. 13, 2020, nine pages.

PCT International Search Report and Written Opinion, PCT International Application No. PCT/US2020/052706, Dec. 7, 2020, eight pages.

PCT International Search Report and Written Opinion, PCT International Application No. PCT/US2020/052755, Feb. 11, 2021, eight pages.

Vorobiova, N.S. et al., "NOVI time series modeling in the problem of crop identification by satellite images," Information Technology and Nanotechnology, 2016, pp. 428-436.

Wardlow et al., "Discriminating cropping patterns in the US Central Great Plains region using time-series MODIS 250-meter NOVI

(56) References Cited

OTHER PUBLICATIONS data-Preliminary Results," In Proceedings, Pecora 15 and Land Satellite Information IV Conference, 2002, pp. 1-12.

Xie, Y. et al., "Mapping irrigated cropland extent across the conterminous United States at 30 m resolution using a semi-automatic training approach on Google Earth Engine," ISPRS Journal of Photogrammetry and Remote Sensing, vol. 155, Sep. 2019, pp. 136-149.

Zhang, G. et al., "Mapping paddy rice planting areas through time series analysis of MODIS land surface temperature and vegetation index data," ISPRS Journal of Photogrammetry and Remote Sensing, vol. 106, Aug. 2015, pp. 157-171.

Lin, X. et al., "Carbon Emissions Estimation and Spatiotemporal Analysis of China at City Level Based on Multi-Dimensional Data and Machine Learning," Remote Sensing 14(13), 3014, Jun. 23, 2022, pp. 1-18.

Luo, D. et al., "Integrated Carbon Footprint and Economic Performance of Five Types of Dominant Cropping Systems in China's Semiarid Zone," Sustainability 14(10), 5844, May 11, 2022, pp. 1-17.

PCT International Search Report and Written Opinion, PCT Application No. PCT/US2023/078118, Feb. 22, 2024, 11 pages.

Aji et al., "Hadoop-GIS: A High Performance Spatial Data Warehousing System over MapReduce," Proceedings VLDB Endowment, 6(11) (33 pages) (2013).

International Search Report and Written Opinion for International Application No. PCT/US2021/030196 mailed Aug. 4, 2021.

Wang, "A Large-scale Dynamic Vector and Raster Data Visualization Geographic Information System Based on Parallel Map Tiling," FIU Electronic Theses and Dissertations, (54 pages) (2011).

Github, "cogeo-mosaic," Jun. 13, 2019, pp. 1-11, [Online] Retrieved from the Internet <URL: https://github.com/developmentseed/mosaicjson-spec>.

Github, "Marblecutter," Jul. 31, 2017 pp. 1-4, [Online] Retrieved from the Internet <URL:https://github.com/mojodna/marblecutter>.

Github, "rio-tiler," Oct. 14, 2020, pp. 1-14, [Online] Retrieved from the Internet <URL:https://github.com/cogeotiff/rio-tiler>.

Github, "Terracotta," Mar. 6, 2018, pp. 1-5, [Online] Retrieved from the Internet <URL:https://github.com/DHI/terracotta>.

PCT International Search Report and Written Opinion, PCT Application No. PCT/US2023/085208, Apr. 29, 2024, eight pages.

Ritchie, G.L. et al., "Sensitivities of Normalized Difference Vegetation Index and a Green/Red Ratio Index to Cotton Ground Cover Fraction," Crop science, vol. 50, May 2010, pp. 1000-1010.

United States Office Action, U.S. Appl. No. 17/681,126, filed Apr. 25, 2024, 16 pages.

Htitiou, A. et al., "The performance of random forest classification based on phenological metrics derived from Sentinel-2 and Landsat 8 to map crop cover in an irrigated semi-arid region," Remote Sensing in Earth Systems Sciences 2.4, Oct. 29, 2019, pp. 208-224.

Wu, X., "Variation and Causal Factors of Planting Area and Phenological Events of Winter Wheat in the North China Plain," Doctoral dissertation, Chiba University, Feb. 2020, pp. 1-154.

\* cited by examiner

DYNAMIC DATA TILING

CROSS REFERENCE TO RELATED APPLICATION

This Application is a continuation of International Application No. PCT/US2021/030196, filed Apr. 30, 2021, which claims the benefit of U.S. Provisional Patent Application No. 63/019,071, filed on May 1, 2020, and U.S. Provisional Patent Application No. 63/074,319, filed Sep. 3, 2020, each of which is hereby incorporated herein by reference in its entirety.

BACKGROUND

Embodiments of the present disclosure relate to geographic data rendering and transmission in network environments, and more specifically, to dynamic data tiling.

BRIEF SUMMARY

According to embodiments of the present disclosure, methods of and computer program products for dynamic data tiling are provided. In various embodiments, a request is received for a tile of geographic data from a requestor. The request specifies a region relative to a projection. The region is looked up in a spatial index to determine one or more source tiles. The spatial index corresponds to the projection and the one or more source tiles intersecting the region. The one or more source tiles are requested from a proxy. The proxy is configured to maintain one or more persistent connections to one or more datastores and to retrieve the one or more source tiles via the one or more persistent connections. The one or more source tiles is received from the proxy. The requested tile of geographic data is constructed from the one or more source tiles. The requested tile of geographic data is provided to the requestor.

In some embodiments, the spatial index is persisted in memory between requests.

In some embodiments, the request further specifies a layer and a date. In some embodiments, the request is validated. In some embodiments, validating the request comprises looking up the layer and the date in a database.

In some embodiments, the proxy is further configured to retrieve multiple source tiles in parallel.

In some embodiments, constructing the requested tile of geographic data comprises constructing a mosaic of the one or more source tiles. In some embodiments, constructing the requested tile of geographic data comprises masking, scaling, and/or applying a color map. In some embodiments, the request comprises one or more configuration parameters, the one or more configuration parameters specifying the masking, scaling, and or application of a color map. In some embodiments, constructing the requested tile of geographic data comprises generating an image file.

In some embodiments, the requested tile of geographic data is cached for future requests.

In some embodiments, the one or more source tiles comprise satellite data and/or one or more agricultural index.

In some embodiments, the one or more source tiles do not conform to the projection, and wherein constructing the requested tile of geographic data comprises projecting the one or more source tiles to the projection.

According to embodiments of the present disclosure, methods of and computer program products for determining data layer coverage are provided. In various embodiments, a request is received for availability information of geographic data from a requestor. The request specifies a region relative to a projection. The region is looked up in a spatial index to determine one or more source tiles. The spatial index corresponds to the projection. The one or more source tiles intersect the region. The one or more source tiles are requested from a proxy. The proxy is configured to maintain one or more persistent connections to one or more datastores and to retrieve the one or more source tiles via the one or more persistent connections. The one or more source tiles are received from the proxy. The requested availability information is constructed from the one or more source tiles. The requested availability information is provided to the requestor.

In some embodiments, the spatial index is persisted in memory between requests.

In some embodiments, the request further specifies a layer and a date.

In some embodiments, the request is validated.

In some embodiments, the proxy is further configured to retrieve multiple source tiles in parallel.

In some embodiments, the requested availability information of geographic data is cached for future requests.

In some embodiments, the one or more source tiles comprise satellite data and/or one or more agricultural index.

In some embodiments, the availability information comprises a coverage percentage of the region.

In some embodiments, determining the one or more source tiles comprises substituting an overview image for the one or more source tiles intersecting the region when the one or more source tiles intersecting the region exceed a predetermined maximum.

In some embodiments, constructing the requested availability information comprises executing a Map/Reduce task.

DETAILED DESCRIPTION

Figure 1:
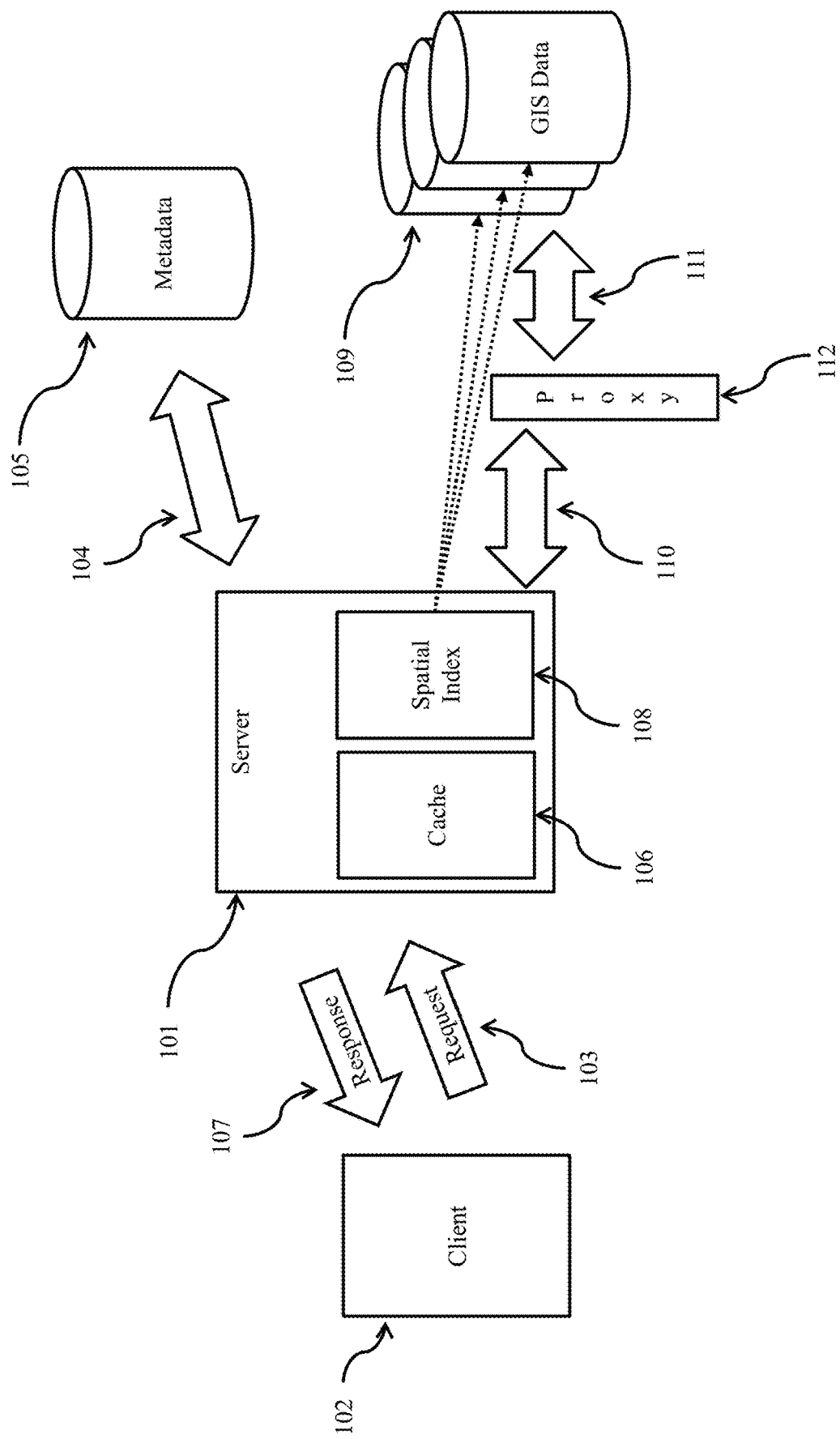
FIG. 1 illustrates a system architecture for dynamic data tiling according to embodiments of the present disclosure.

Various use cases require the visualization of large datasets, such as maps, via a network. Large data sets pose particular challenges, both in terms of storage, bandwidth utilization, and latency. These challenges are compounded by use cases requiring just in time retrieval or rendering. Accordingly, there is a need for systems and methods for dynamic data tiling that enable increased efficiency and responsiveness.

Various acronyms known in the art are used throughout the application. These include: ROI (Region of Interest), AOI (Area of Interest), WKT (Well Known Text format representation of a geometry).

The present disclosure provides for serving visualizations of raster imagery as map tiles with visualization choices computed at request time (dynamic) instead of ahead of time (static). In various embodiments, a service is provided that can render these visualizations seamlessly across large areas by spatially mosaicking multiple source images on the fly.

Alternative approaches that may be suitable for single source images are not suitable for datasets involving multiple sources, particularly where the multiple sources overlap.

Dynamic tiles are particularly important for use cases in which time sensitive information is presented that cannot be captured in a base map. For example, agricultural applications may require the most recent images of individual fields at high spatial resolution in order to support decision-making. Delivery of high quality date-specific imagery is prohibitively expensive computationally using conventional static tiles.

Various approaches may adopt a serverless or persistent server paradigm. While a serverless approach may minimize the use of persistent resources, it leads to significant overhead in setup and teardown that leads to increased latency in request handling. Accordingly, as set out further below, various embodiment employ persistent server resources.

In various embodiments, an in-memory spatial index is used to determine which source imagery should be used to render a given map tile request. In various embodiments, this spatial-index is pre-computed with coordinates stored in the Web Mercator projection used by map tile applications, which increases efficiency compared to doing the conversion from Web Mercator to the projection used by the source imagery. More generally, an index may be pre-computed according to any projection used for queries.

This approach results in higher efficiency than approaches that use a database such as PostGIS, because it does not rely on communication with another remote machine. There is no loss in speed and precision of geometric computations compared to such alternatives.

In various embodiments, a highly accurate spatial index is maintained in memory. An alternative approach would be to map quadkeys to source imagery in order to determine which source image(s) need to be read in order to render a tile. Quadkeys are limited to one zoom resolution and are therefore relatively imprecise, which results in spurious reads of source imagery that does not intersect with a requested map tile.

In various embodiments, a persistent, dedicated server is used rather than serverless technology (e.g., AWS Lambda). This is advantageous because it enables the storage of information across requests. For example, the spatial index may be stored in-memory for reuse across map tile requests. An in-memory spatial index would be too resource expensive to re-initialized on each use as would be necessary in a severless design.

The use of a dedicated server also enables rapid map tile responses because it allows for the re-use of HTTP connections for reading source imagery. In various embodiments, re-use of HTTP connections is accomplished through the use of an HTTP proxy. In various embodiments, the underlying GIS data is accessed by an appropriate library such as GDAL/OGR. In such embodiments, the HTTP proxy persists GDAL connections. According to benchmark results, re-using HTTP connections in this manner reduces response time by half while decreasing the variance of these responses.

In an exemplary embodiments, a tiling system is defined in which the globe is covered by a predetermined grid system, with each grid element identified by x/y parameters. A zoom level is given by a z parameter. In one such tiling system, the number of tiles is shown in Table 1.

TABLE 1

| Zoom | # Tiles |
| --- | --- |
| 0 | 1 |
| 1 | 4 |
| 2 | 16 |
| 8 | 65,536 |
| 12 | 16,777,216 |
| 15 | 1,073,741,824 |

Referring now to FIG. 1, a system architecture for dynamic data tiling according to embodiments of the present disclosure is illustrated. Server 101 provides a dynamic tiling service accessible to client 102. Client 102 may access server 101 via a variety of methods known in the art, for example via HTTP or HTTPS requests implementing a REST, RPC, SOAP, or JSON API. In some embodiments, server 101 provides access to images formatted according to the Cloud Optimized GeoTIFF specification, described further below.

The dynamic tiling service generates web tiles from satellite imagery for use in web or mobile applications. This enables the display of a tiled web map in a browser or other application by seamlessly joining multiple individually requested image or vector data files. This approach is useful for displaying geographic data such as maps or other location-based information. Various embodiment may use raster tiles or vector tiles.

Tiled maps are advantageous over fetching a single image. For example, during panning operations, many tiles remain relevant, while a small number of tiles may be incrementally fetched. Individual tiles may be precomputed on the server side, enabling efficient parallel processing. Server side precomputation or rendering allows computational burden to be shifted to the server from the client, leading to greater client-side efficiency and reduced bandwidth requirements.

In various embodiments, the present disclosure generates image tiles from satellite source data. In some embodiments, the computation of image tiles may use the Cloud Optimized GeoTIFF (COG) format for efficient I/O. It will be appreciated that a variety of image tiles may be generated, including those that reflect computed values such as agricultural indices. Various indices, for example, normalized difference vegetation index (NDVI), land surface water index (LSWI), and mean brightness (BRT), may be used.

Client 102 requests imagery from server 101 according to a standardized API, allowing integration with server 101 by any of a variety of clients. As discussed herein, image tiles are generated as requested, allowing the exposure of additional styling features to the user and cutting down on the cost of creating and storing each layer. A layer can be a satellite image raster tile set, described by type, resolution, or metrics.

Figure 2:
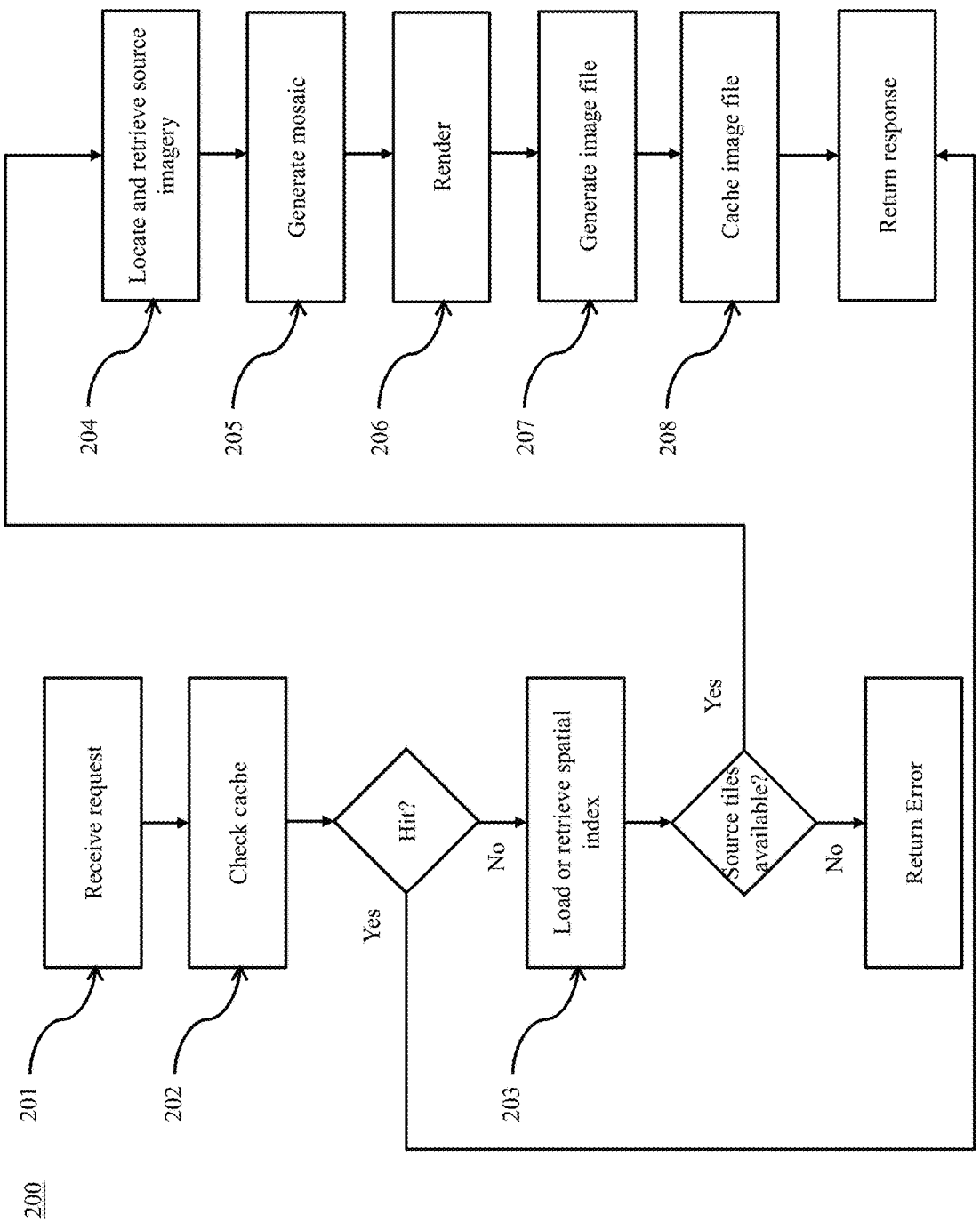
FIG. 2 illustrates a process for rendering a map tile according to embodiments of the present disclosure.

Referring now to FIG. 2, a process for rendering a map tile according to the present disclosure is illustrated. Process 200 may be performed using the architecture illustrated in FIG. 1.

At 201, a request 103 for a map tile (noted by, e.g., X/Y/Z coordinates) is received at server 101 for a requested date and map layer. In some embodiments, the request includes one or more visualization parameters (e.g., colormap, scaling, data masking options, etc.). In various embodiments, the date and map layer information in the request are validated in a database registry, for example by sending a query 104 to database 105 for existence of the subject date and map layer. It will be appreciated that for different data sources, there may be variable availability for a given date. Accordingly, in some embodiments, a configurable rounding parameter may be applied to provide substitute data within a certain range of the requested date.

At 202, request 103 is optionally checked against cache 106. In various embodiments, cache 202 is implemented by an in-memory caching server (e.g., AWS ElastiCache). However, it will be appreciated that a variety of caching mechanisms are known in the art, including mechanisms leveraging memory or local storage. If there is a cache hit, cached data from previous requests may be returned in response 107 to client 102. If not, an appropriate tile is generated in the following steps. In various embodiments, a configurable cache expiration window is provided.

At 203, a spatial index 108 is loaded or retrieved from memory. As noted above, the spatial index may correspond to a predetermined projection, such as Web Mercator. In some embodiments, multiple indices are provided, one for each output projection of interest. In some embodiments, multiple indices are provided, one for each source projection. In such embodiments, multiple concurrent lookups may be performed for a given location. The spatial index 108 checked for intersection with the requested map tile. If there are no source tiles intersecting the requested area, then an error code is returned in response 107. If there are intersecting source tiles, they are retrieved in the following steps.

It will be appreciated that various data sources may have different updates cycles, different coverage, different source tile size, different projections, and different resolutions. Accordingly, it is desirable to maintain the index relative to the projection to be used in requests, and to dynamically generate tiles with current information as requested. For example, the Harmonized Landsat Sentinel-2 (HLS) product provides observations at spatial resolutions high enough to resolve sub-field processes (approximately 30 m resolution), but the latency remains on a weekly time scale given the overpass times of Landsat 8 and Sentinel-2 sensors, as well as cloud and snow coverage. On the other hand, MODIS-based imagery can be available daily, but the spatial resolution of 250+m is too coarse to work on a field scale.

At 204, the location of the source imagery for the requested date is determined based on the results from spatial index 108. In particular, one or more source tiles intersecting the requested map tile are identified in underlying datastore(s) 109. In various embodiments, source tiles from various sources (e.g., from different satellite datasets) are stored in different datastores. In various embodiments, where more than one source tile intersects the requested source tile, the source tiles are retrieved in parallel from one or more datastores. In some embodiments, any requested data masks (e.g., cloud mask, land/water mask, boundary mask) are applied during this parallel reading step. In some embodiments, applying a data mask is performed with reference to one or more band per source tile. In some embodiments, a boundary mask is provided as a vector and indicated by, for example, a GeoJSON string query parameter or a region ID tied to a database record.

In some embodiments, requests to read data, and responses thereto (110, 111), are routed through an HTTP proxy 112. In some embodiments proxy 112 is implemented using, e.g., Nginx. Proxy 112 is configured to keep alive network connections, thereby reducing the setup and teardown overhead associating with connecting to datastore(s) 109.

At 205, as data from the source imagery is returned from datastore(s) 109, a spatial mosaicking step is performed, that merges data from different source tiles to form one seamless map tile. As noted above, in various embodiments, each source tile is retrieved in parallel, for example using one thread per source tile request. In some embodiments, each band per tile is retrieved in parallel, e.g., with one thread per band. In various embodiments, a layer may include one to five bands. For example, RGB uses three bands for the image, one band for a cloud masked, and one band for land/water mask. A vegetation index like NDVI requires just one band and might not be masked.

At 206, once data from source imagery are retrieved, a rendering step is performed to make the source data suitable for visualization. Depending on the characteristics of the source imagery, these steps might include the application of scale factors and/or categorical or continuous colormaps. In some embodiments, rendering may include rasterization of vector images, computation of requested agricultural indices, or geometric transformation of the source images.

At 207, the rendered map tile data is converted into an image file format (e.g., PNG) and return in response 107 with any accompanying data.

At 208, the completed request is cached in cache 106 for possible reuse in the future.

As noted above, in various embodiments, Cloud Optimized GeoTIFF (COG) is employed for the delivery of one or more map tiles. COG is a specification for TIFF files that can be read quickly on the cloud using HTTP GET range requests. This is especially useful when asking for a subset of the data (e.g., for a making a web tile or doing a zonal summary). COG provides an optimized TIFF header. The image is then tiled into blocks, and optionally includes low-resolution overviews. The usage of overviews (also known as image pyramids) is useful to read an area in the image, but not the full spatial detail. Rather than reading the entire area and resampling to downscale to the appropriate size, the pre-computed, downsampled overview stored inside a GeoTIFF file may be read. In various exemplary embodiments, GDAL may be used. In particular, an "Image File Directory" (IFD) is the metadata in COGs that readers use to determine the location in the GeoTIFF file containing image data and overviews.

Figure 3:
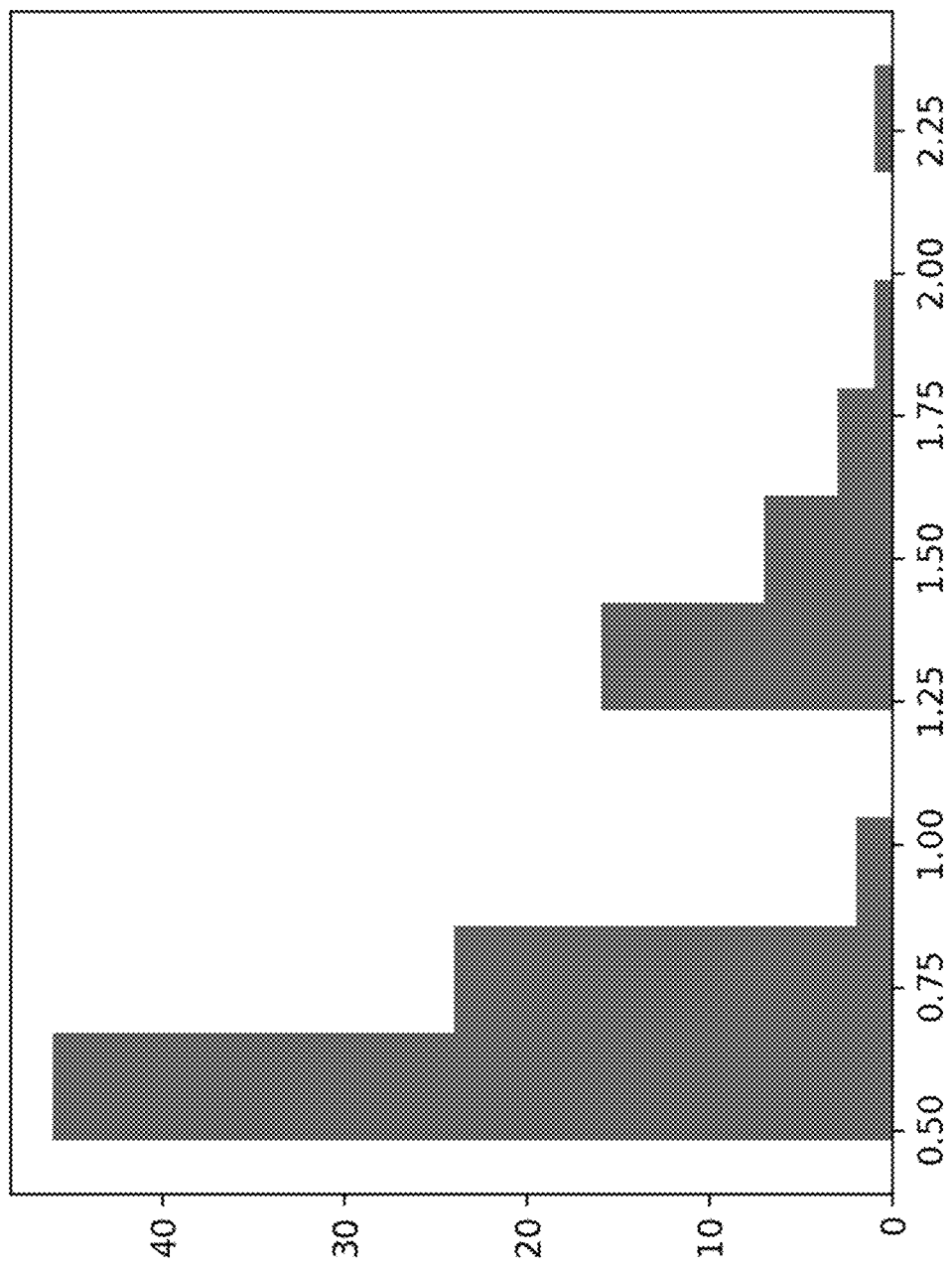
FIG. 3 is a histogram of dynamic tile generation times without a proxy.
Figure 4:
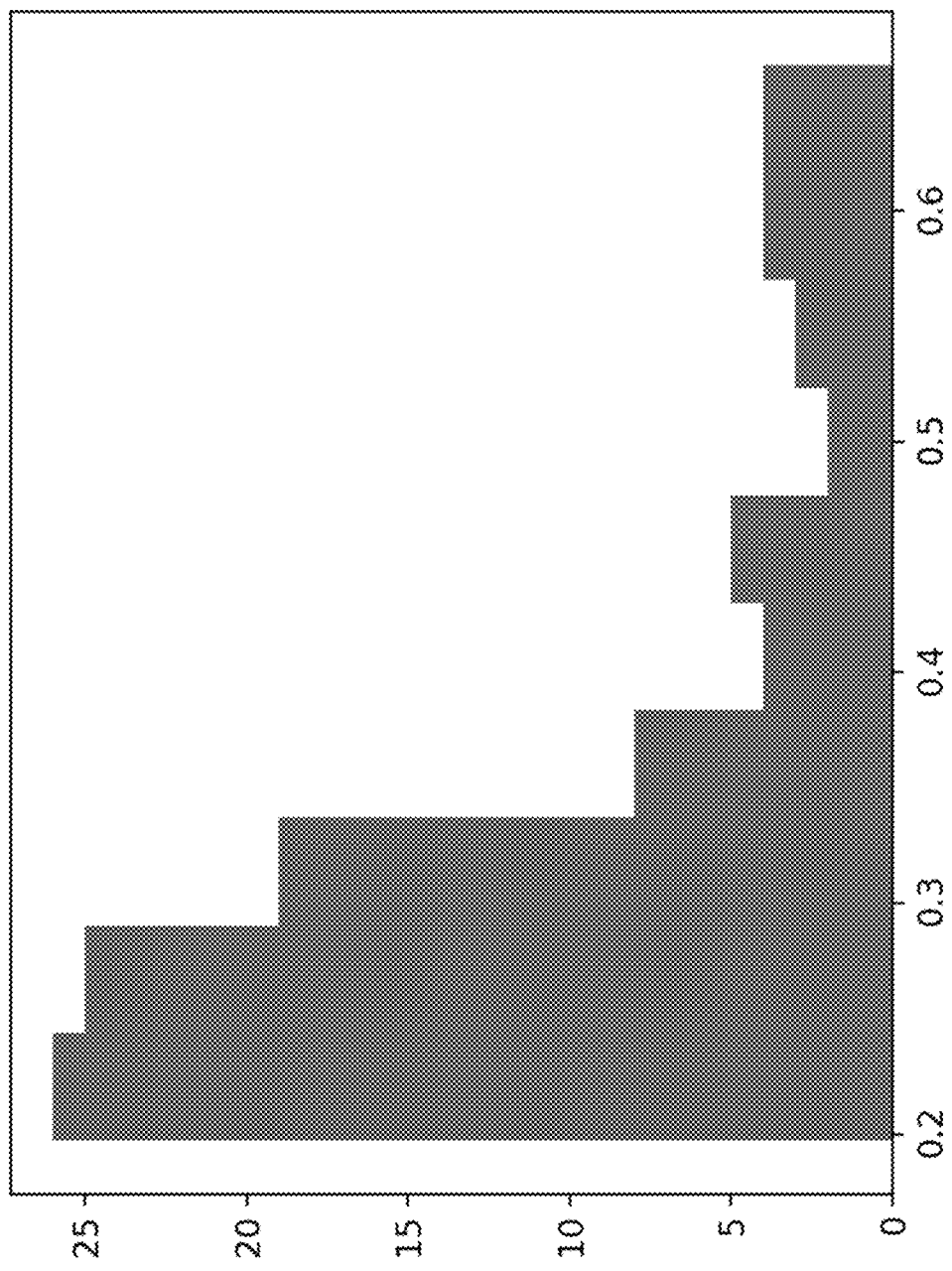
FIG. 4 is a histogram of dynamic tile generation times with a proxy according to embodiments of the present disclosure.

Referring now to FIGS. 3-4, tile response time histograms are provided for dynamic tile retrieval with and without a proxy as described above. In this example, GDAL is used for retrieval of data from S3. In FIG. 3, connections are not kept alive after use, resulting in significant overhead for connection creation. In FIG. 4, a Nginx proxy is provided as set forth above, which keeps connections alive. As may be seen in these graphs, this significantly reduces the mean and variance of the response times.

Figure 5:
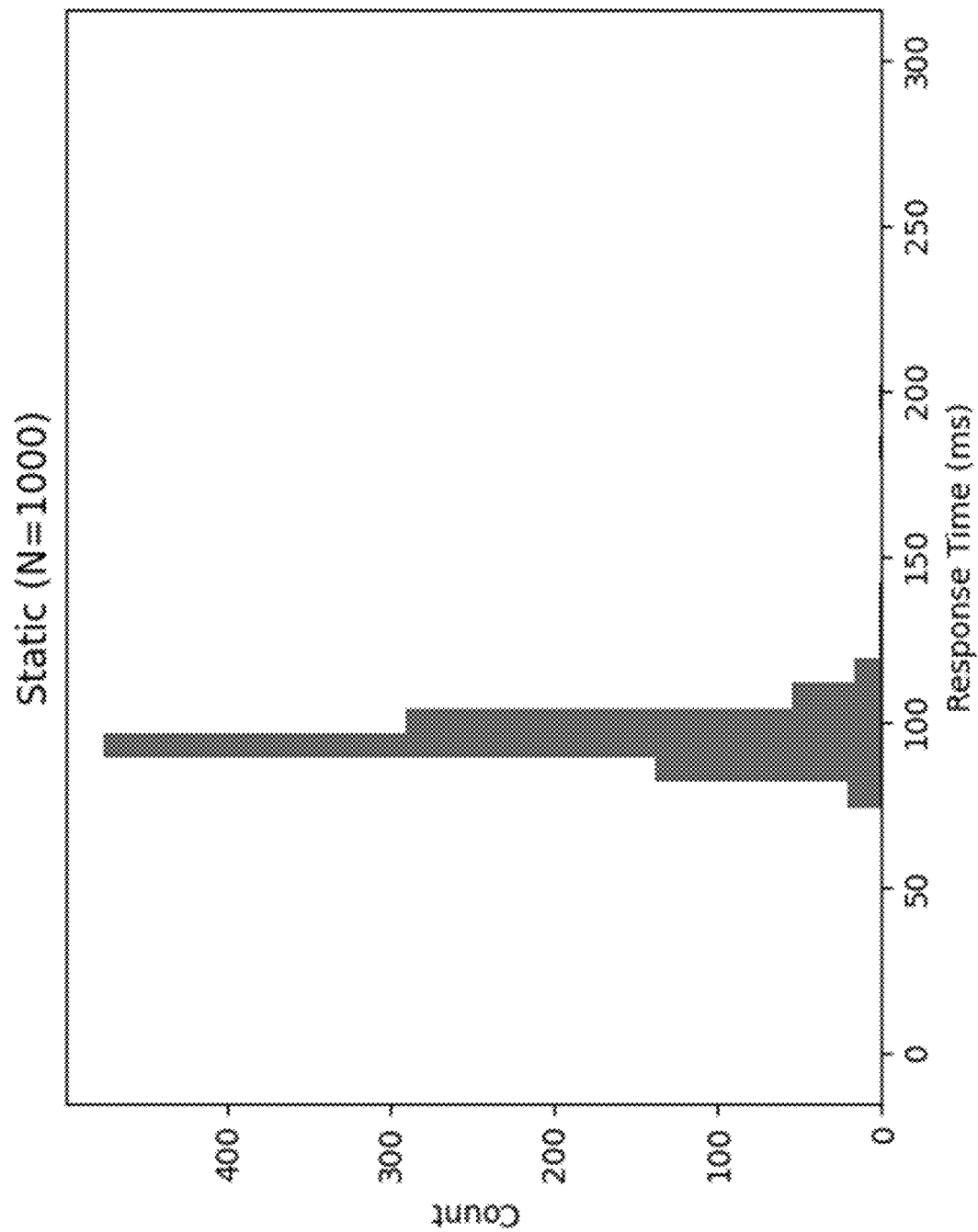
FIG. 5 is a histogram of static tile generation times.
Figure 6:
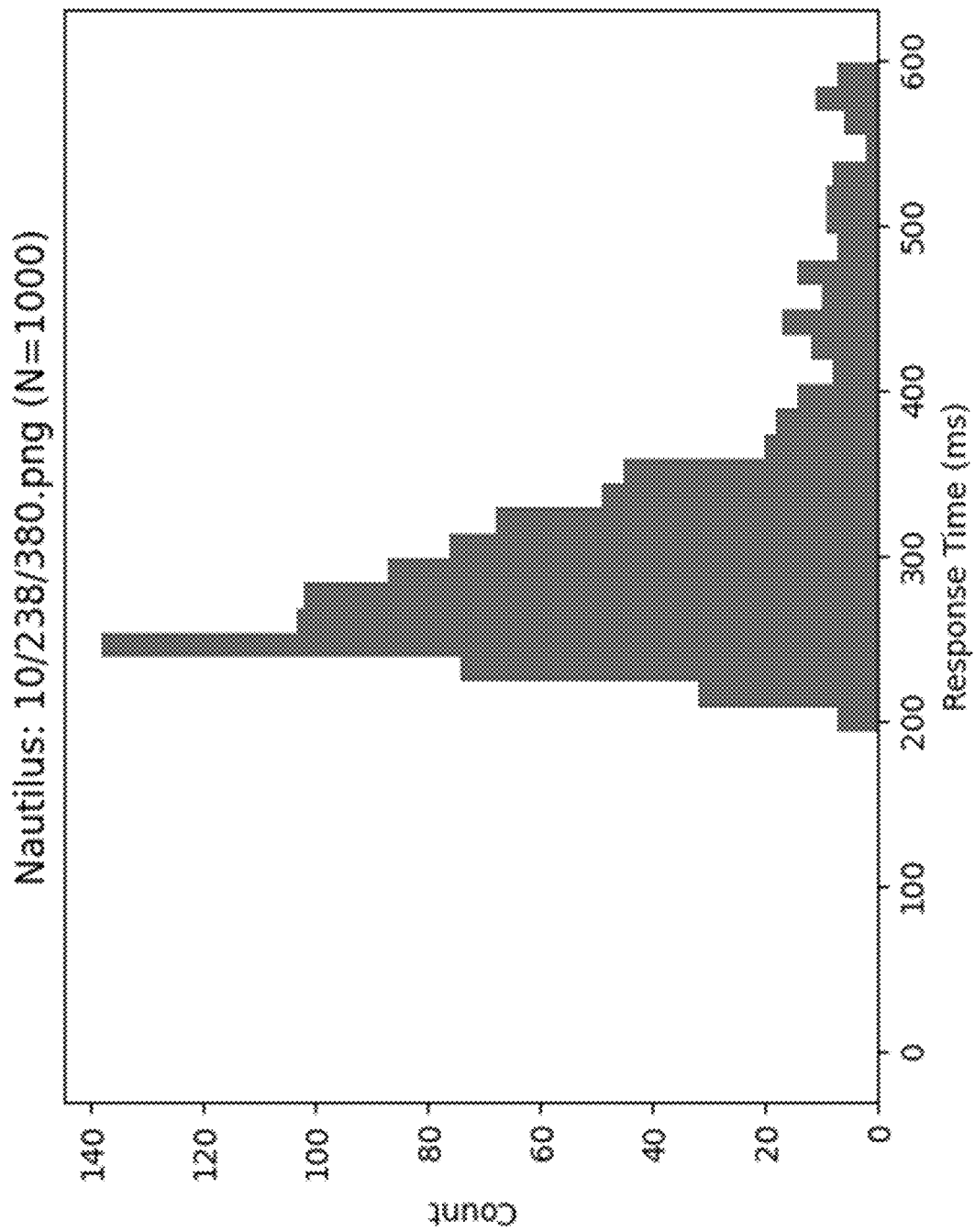
FIG. 6 is a histogram of dynamic tile generation times with a proxy according to embodiments of the present disclosure.

Referring now to FIGS. 5-6, tile response time histograms are provided for dynamic and static tile retrieval. FIG. 5 reflects static tile retrieval. FIG. 6 reflects dynamic retrieval including a proxy as set forth above. In both cases, the response times are inclusive of network communication as well as computation time. In addition to providing connection keep-alive, in this example SSL is turned off by the proxy. As may be seen in these graphs, dynamic tile generation may be provided at close to the same performance as a static tile.

Figure 7:
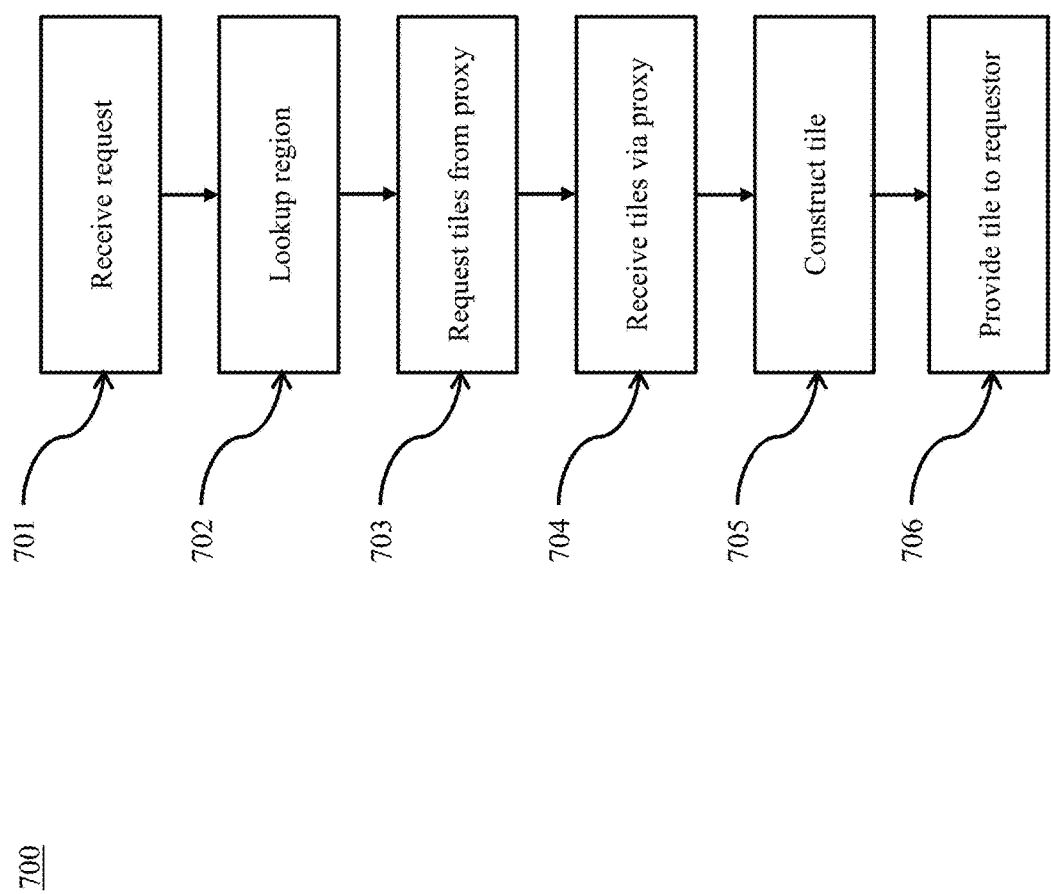
FIG. 7 illustrates a method for dynamic data tiling according to embodiments of the present disclosure.

Referring to FIG. 7, a method of dynamic data tiling is illustrated according to embodiments of the present disclosure. At 701, a request is received for a tile of geographic data from a requestor. The request specifies a region relative to a projection. At 702, the region is looked up in a spatial index to determine one or more source tiles. The spatial index corresponds to the projection and the one or more source tiles intersecting the region. At 703, the one or more source tiles are requested from a proxy. The proxy is configured to maintain one or more persistent connections to one or more datastores and to retrieve the one or more source tiles via the one or more persistent connections. At 704, the one or more source tiles is received from the proxy. At 705, the requested tile of geographic data is constructed from the one or more source tiles. At 706, the requested tile of geographic data is provided to the requestor.

In various embodiments, the approaches set forth herein provide several advantages. Available imagery is discoverable—in various embodiments, API endpoints are provided for listing the available image layers and dates, as well as the style options that can be applied to each. Flexible image styling is provided—in various embodiments, users can select colormap, stretch, and masks on-the-fly. Because a single static style is not predetermined, users can experiment with these options to highlight interesting features in their areas of interest. Reduced cost and latency—tiles are rendered as they are viewed, instead of making all possible tiles in advance (most of which are never viewed). By removing the bulk generation step, imagery may be shown in a UI as soon as the imagery itself is available, cutting hours off of processing time. Speed—benchmarks show that dynamic tiles may be generated at near the speed of pre-computed (static) tiles Region-of-interest imagery—In various embodiments, users can specify a region-of-interest (e.g., a field). Based on the ROI, a user may receive available dates for which the ROI is populated, automatically clip imagery to the ROI limits, and enhance the color stretch to highlight features within the ROI.

Figure 8:
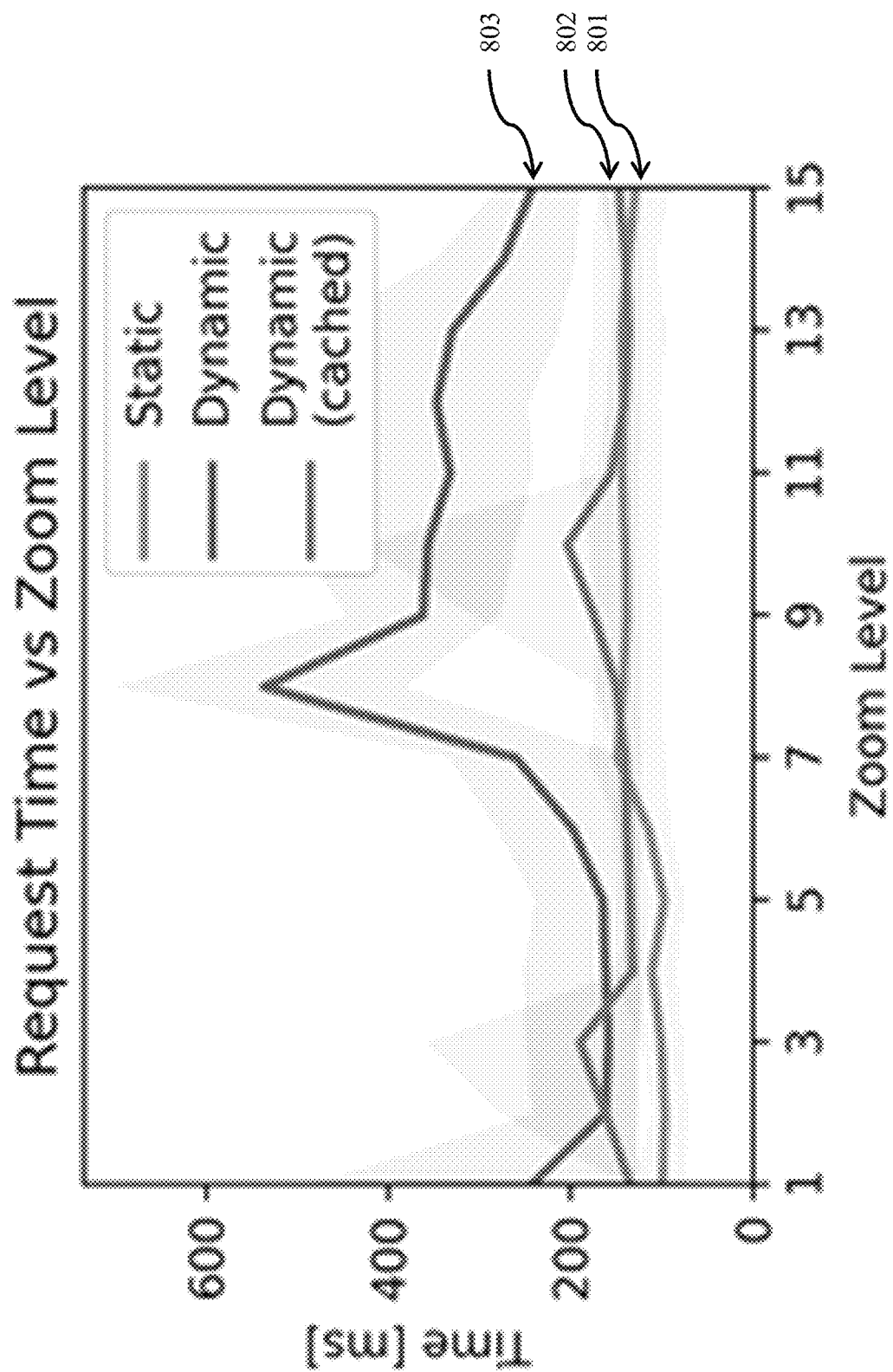
FIG. 8 is a graph of request time versus zoom level for static and dynamic tiles according to embodiments of the present disclosure.

Referring to FIG. 8, a graph is provided of request time versus zoom level for static and dynamic tiles according to embodiments of the present disclosure. In particular, tile request response time is given as a function of zoom level for static 801, dynamic 802, and dynamic-cached 803 requests. As shown, dynamic tile generation is slower as at higher zoom levels (corresponding to zoomed out views), as more source images must be processed to generate a given tile. This delay may be mitigated by caching repeatedly-viewed tiles, as described above.

In addition, in some embodiments, pre-processing is performed for certain zoom ranges. For example, zoomed out views above a certain zoom level may be pre-generated. In this way, the cache can be seeded with data in advance of the first query. For example, generation of a fully zoomed out view of the United States would entail reading from 987 COGs, resulting in an unreasonable number of read requests to underlying images. By employing pre-processing, read access is minimized for the highest zoom levels (corresponding to the most zoomed out views), thereby increasing overall performance without compromising the performance tradeoffs of dynamic tile generation at other zoom levels.

It will be appreciated that pre-generation may be employed for a frequently accessed subset of indices, such as NDVI, or for all indices. It will also be appreciated that seeding the cache as set out above may be employed with respect to predetermined geographies, zoom levels, or periods of time.

As noted above, in addition to retrieving tiles, embodiments of the present disclosure may be used to discover availability of imagery. Users of such API endpoints are able to request coverage information regarding specified layers over a window of time and geographic location. In exemplary embodiments, a polygon or polygons defining a region-of-interest and an imagery layer description (e.g., type/resolution/metric/version) are included in a query. Exemplary output includes pairs of [(date, percent_populated), . . . ] containing all dates for which imagery exists in the region-of-interest, and the fraction of the input polygons that is observed (not cloud). The methods provided herein are fast enough for use in a live user interface.

In an exemplary implementation, API endpoints are specific to each different layer. The URI may be structured so that the request type (e.g., /coverage) is appended to the layer description provided by a client. This minimizes URI rewriting to switch from doing tasks such as requesting layer metadata or tiles to asking for coverage. An endpoint is provided for all layers that are backed by COGs, providing coverage for all data except the coarse resolution crop basemaps/masks. The ROI coverage information is more relevant to some layers than others are (e.g., weather is always 100%). Requests can be supported for all layers.

Exemplary query parameters include: geometries for boundaries, start dates, and end dates. Boundaries may be provided according to an established geodetic system such as WGS84. Boundaries may be provided using a variety of standard formats, including WKT or GeoJSON.

In various embodiments, the endpoint is a POST request to facilitate passing large or complicated polygon geometries to the backend. Basic checks are performed on the provided geometries to ensure correctness and performance. The checks include, but are not limited to, a validity check, coordinate check, and performance check. The validity check includes ensuring one or more valid polygon is provided. The coordinate check includes ensuring that the geometry conforms to an appropriate geodetic model and the latitude is within ±90 degrees. The performance check includes various boundary verification. Complexity conditions include verification that not too many vertices or parts are present to ensure geometry handling and rasterization process is reasonably bounded. Density conditions include exclusion of large porous objects (e.g., a donut hole, a giant L, or a diagonal line). Geometries that fail these checks result in an error code with a validation error included in the message.

Certain corrections may be applied automatically to requests without throwing an error. For example, clockwise/counterclockwise orientation errors may be corrected. However, certain errors such as self-intersections or point density issues are not automatically corrected.

The start and end dates can specify the range of time to consider and allow the user to manually iterate through time ranges of interest across multiple requests. For example, a user can request one week for a quick initial response and work backward requesting months to populate in a calendar. A value is returned for all calendar dates in a desired input range. Dates that are not registered as being available with a desired range will return a null value. This null value can distinguish between a 0% inside a desired region. Example output would include an entry for each date in the query range, with an associated percentage of unmasked pixels over the ROI, or null value where a date is not registered.

The coverage endpoint described herein may result in high computational costs in certain circumstances. For example, a user may request coverage for a very large ROI or coverage for a very large number of dates. To abate the performance impact of requests for a large number of dates, restrictions on the number of dates that may be requested can be imposed. Strategies can be employed for either static or dynamic tiling. To address spatial extent, similar restrictions may be imposed. Alternatively, approximations may be generated, as set forth below.

For both static and dynamic tiling cases, an approximate answer for the coverage of some geometry can be returned by looking at lower than native resolution image tiles. For the static tiling workflow, existing low zoom level tiles are read, leveraging the fact that in this scenario, the data have already been downsampled. For the dynamic tiling workflow, only some of the downsampled versions are prepared, specifically the internal overview (in each COG) and the external overview image (e.g., the continent scale or quarter-globe super-overviews discussed below) that is used to show entire continents at low zoom levels.

For static tiles, a literal image zoom level is use to estimate data availability. For COGs, lower tier approximations of imagery are read. Due to the complexity of reading from multiple source tiles and internal overviews, two thresholds can be defined to determine an approximated answer. The two thresholds include the maximum number of source tiles to read and the maximum number of pixels within an individual source tile.

Most users will make repeated requests. Due to time and resource intensity of such repeated requests, a response caching strategy is useful. As approximations are being served anyhow, minor differences in geometry between requests are inconsequential to the results. To help make repeated queries execute quickly and reduce load on the server, the layer coverage responses per layer, per geometry, and per date can be cached. A cache key is provided that includes: a layer key, which is a unique combination of layer type, layer resolution, metric type, and layer version; a geometry key which is a hash of well-known text (WKT) representation of the geometry; and a date key which is the imagery date.

An alternative approach is to allow an individual user to specify one or more standard ROIs for caching. This has the advantage of providing a relatively simple cache key that is user-specific. However, arbitrary geometries are advantageous for a variety of use cases.

Figure 9:
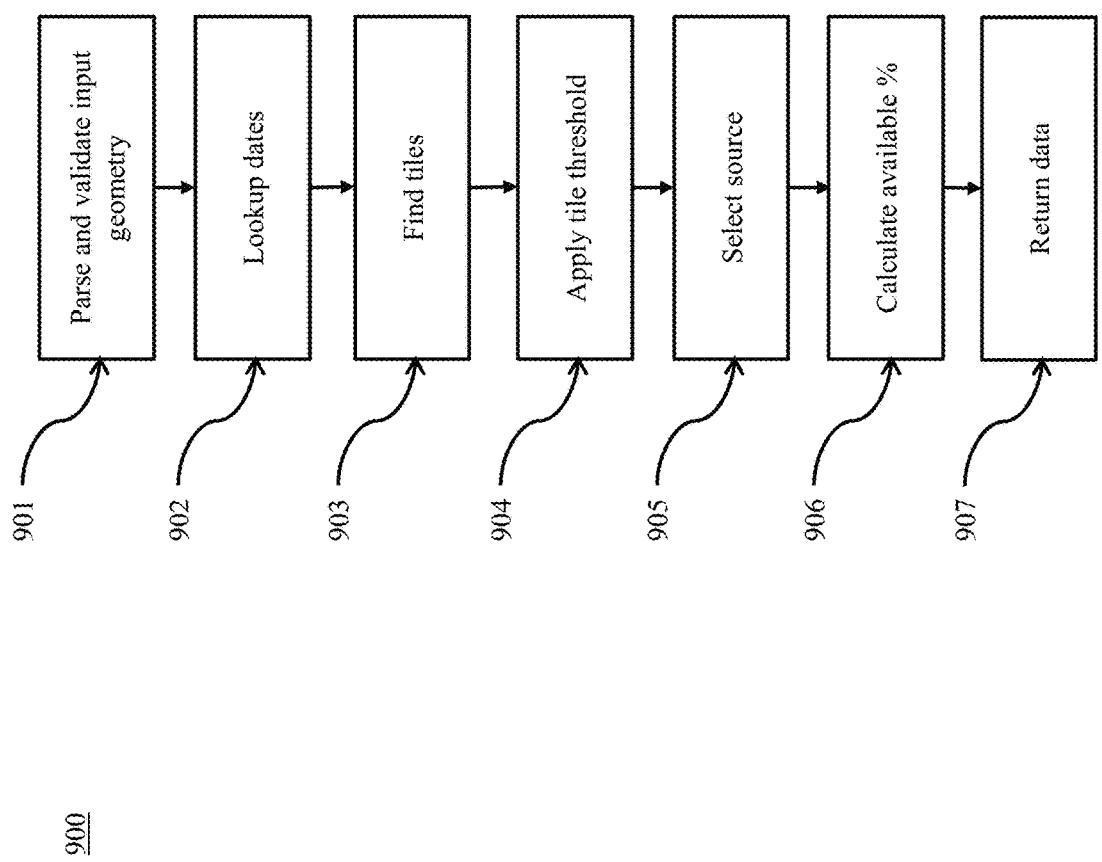
FIG. 9 illustrates a method for response implementation according to embodiments of the present disclosure.

Referring to FIG. 9, a method of coverage determination is illustrated according to embodiments of the present disclosure. As discussed above, users of an endpoint implementing this method will be able to ask for the coverage for layers over a window of time and geographic location. At 901, the input request geometry is parsed and validated. If the requested geometry is complicated in a way that would make summarization slow, it is rejected. For example, one or more maximums may be imposed on requested geometry, for example: a maximum may be imposed on the number of geometry parts (e.g., 50 parts in a MultiPolygon); a maximum may be imposed on the number of vertex points (e.g., 1000); a maximum porosity may be imposed (porosity being defined as the ratio of geometry area to area of a convex hull covering the geometry, e.g., 0.90). Boundary validation may be applied, as noted above.

At 902, the registered dates for the requested layer in the database that overlap the requested date range are looked up. At 903, a grid-tile spatial index is used to find the tiles that intersect the requested geometry. At 904, the number of grid-tiles intersecting the geometry is compared to the parametrized maximum tiles value. If the number of intersecting tiles is less than or equal to the maximum tiles, the boundary is small enough that all source tiles are analyzed. If the intersecting tiles are greater that the number of maximum tiles, the boundary is too large to quickly read all the source data. In this case, pre-generated super-overview images are used, thereby trading accuracy for performance. In some embodiments, quarter-globe super-overviews are available for very low zoom levels.

At 905, it is determined whether to read from a tile's internal overviews or from full-resolution images. For each image that is analyzed, the number of pixels that the boundaries cover within an image is calculated and compared to the maximum pixels per tile parameter. If the number of pixels is greater than the maximum pixels per tile, there are too many pixels to read in the image at full resolution. Instead, an internal image overview is read, which contains a pre-calculated downscaled version of the image. If the number of pixels is less than or equal to the maximum pixels per tile, there is a reasonable amount of data to read and the image is analyzed at its full resolution. Here, the boundary is either small or the source data pixels are very large.

Based on the images selected to read in the prior steps, and based on the number of pixels to read from each image, the overall percent of observed, unmasked available data covering the boundary is calculated at 906. This computation is performed as a Map/Reduce process. For each image that is analyzed, the number of observed/unmasked pixels intersecting the boundary is computed. The total number of pixels intersecting the boundary is computed. The number observed and the total number from each image in the map is combined into an available percentage. In an exemplary case involving two images, a Map step determines [{"observed": 5, "total": 10}, {"observed": 3, "total" 15}], and a Reduce step determines (5+3)/(10+15)*100=32%.

Step 906 can be repeated for dates within a given request interval, a sequence of date/coverage pairs is built and the data is returned to the user.

In the following examples, the endpoint described above is used to drive a filter for image dates based on the minimum coverage in the provided ROI. With daily imagery from a medium resolution satellite like Sentinel-2, the satellite covers only about 20% of the Earth each day so imagery is available for all of North America each day, the coverage on a single field will vary greatly. This presents a problem for selecting useful imagery—one must scan through all dates to find an image appropriate for a local context.

Figure 10:
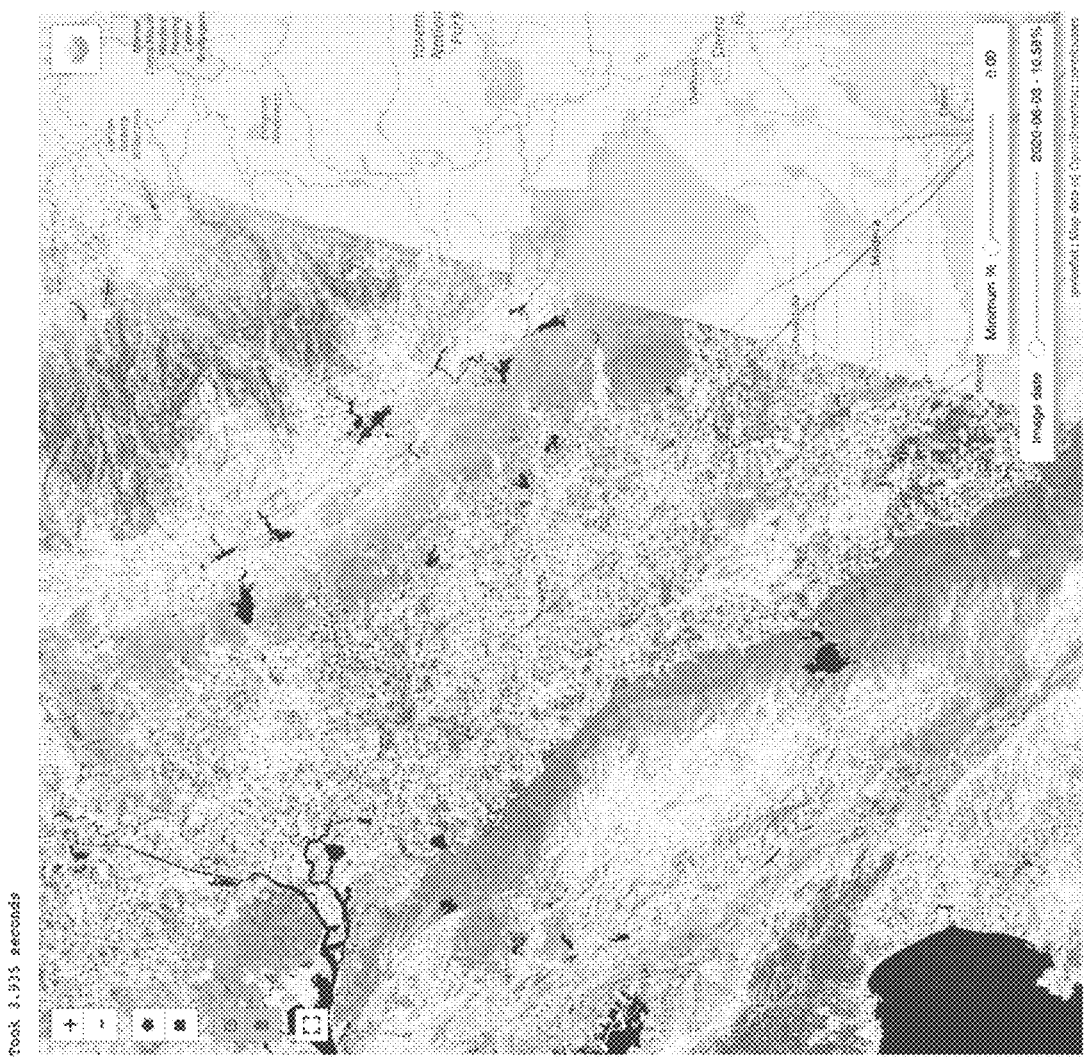
FIG. 10 depicts an image used to demo according to embodiments of the present disclosure.

Now referring to FIG. 10, an example satellite image is shown. This image shows the NDVI from Sentinel-2. The bottom right corner of the image of FIG. 10 has two sliders: the bottom slider show the image date and percentage (%) coverage and allows the user to select a date. The top slider change the minimum % image coverage condition that filters the dates in the date selection slider.

Figure 11:
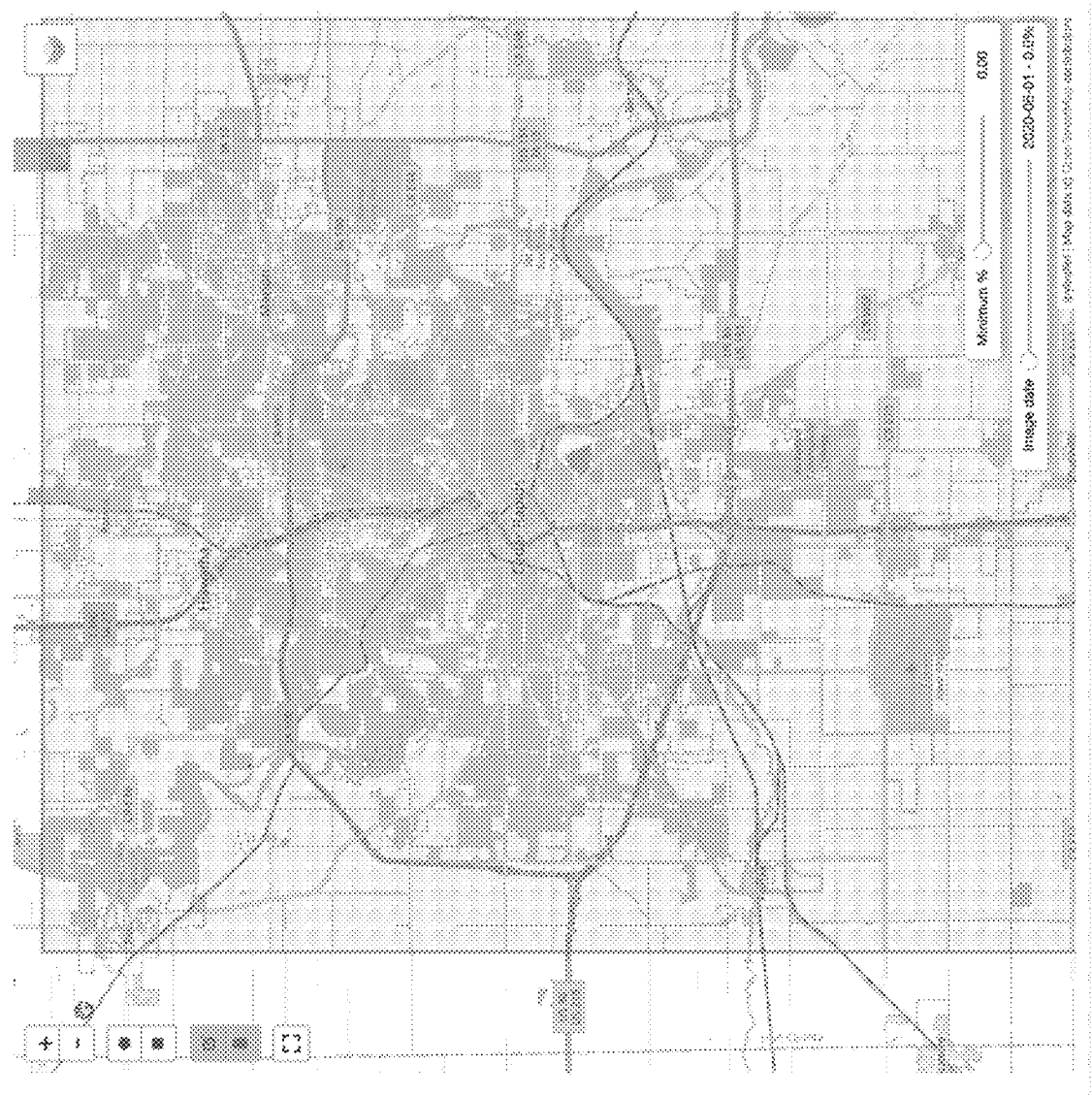
FIG. 11 depicts an image used to demo according to embodiments of the present disclosure.

When a user draws a region, as shown in FIG. 11, the UI asks the coverage endpoint for the coverage over the geometry and updates the coverage information. Now the user can only select dates that meet this minimum condition, making it easier to find useful images.

Figure 12:
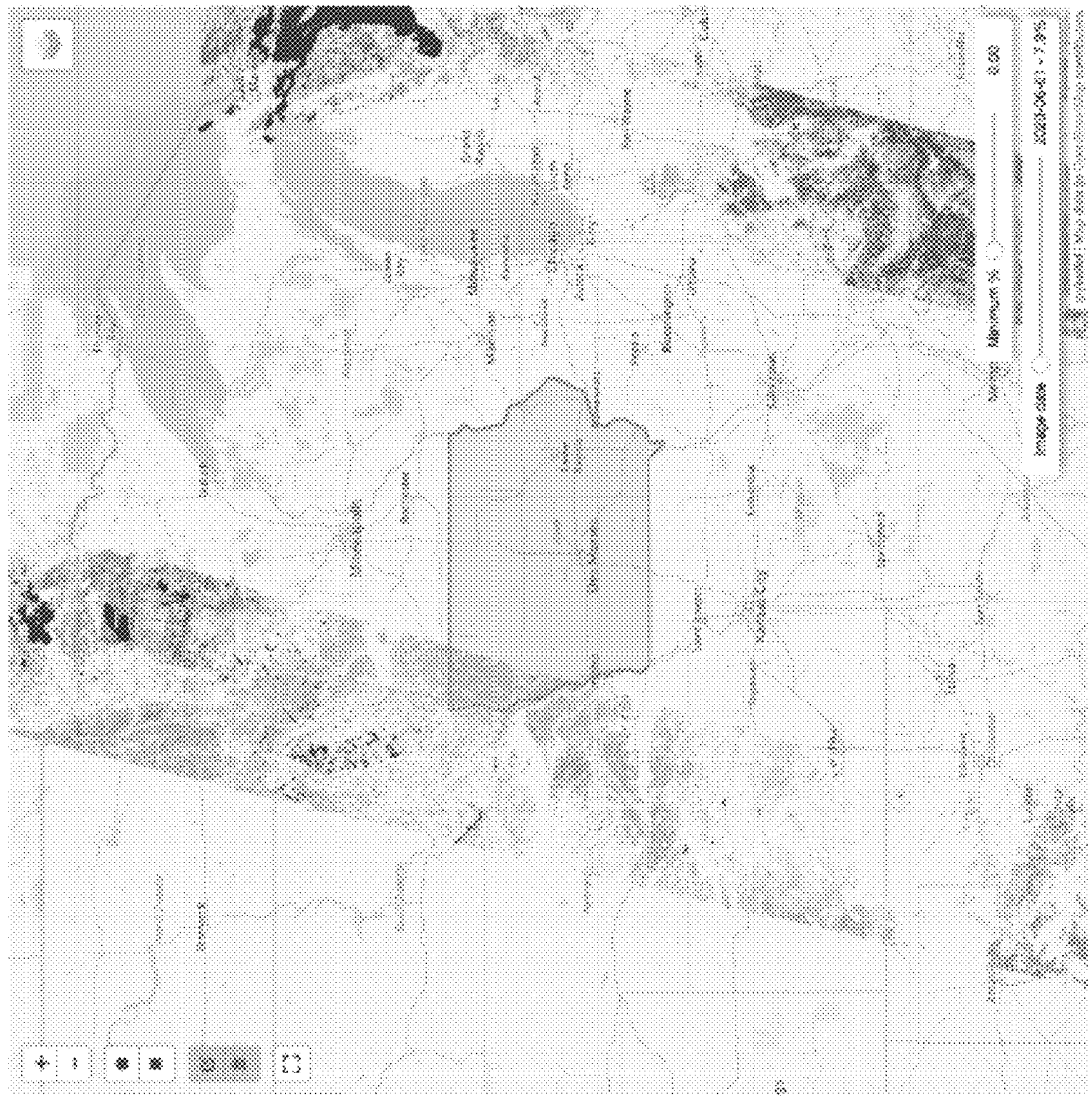
FIG. 12 depicts an image used to demo according to embodiments of the present disclosure.

Also, as seen in FIG. 12, the coverage can also be requested over large regions reasonably quickly. However, for larger requests the data must be downscaled.

Figure 13:
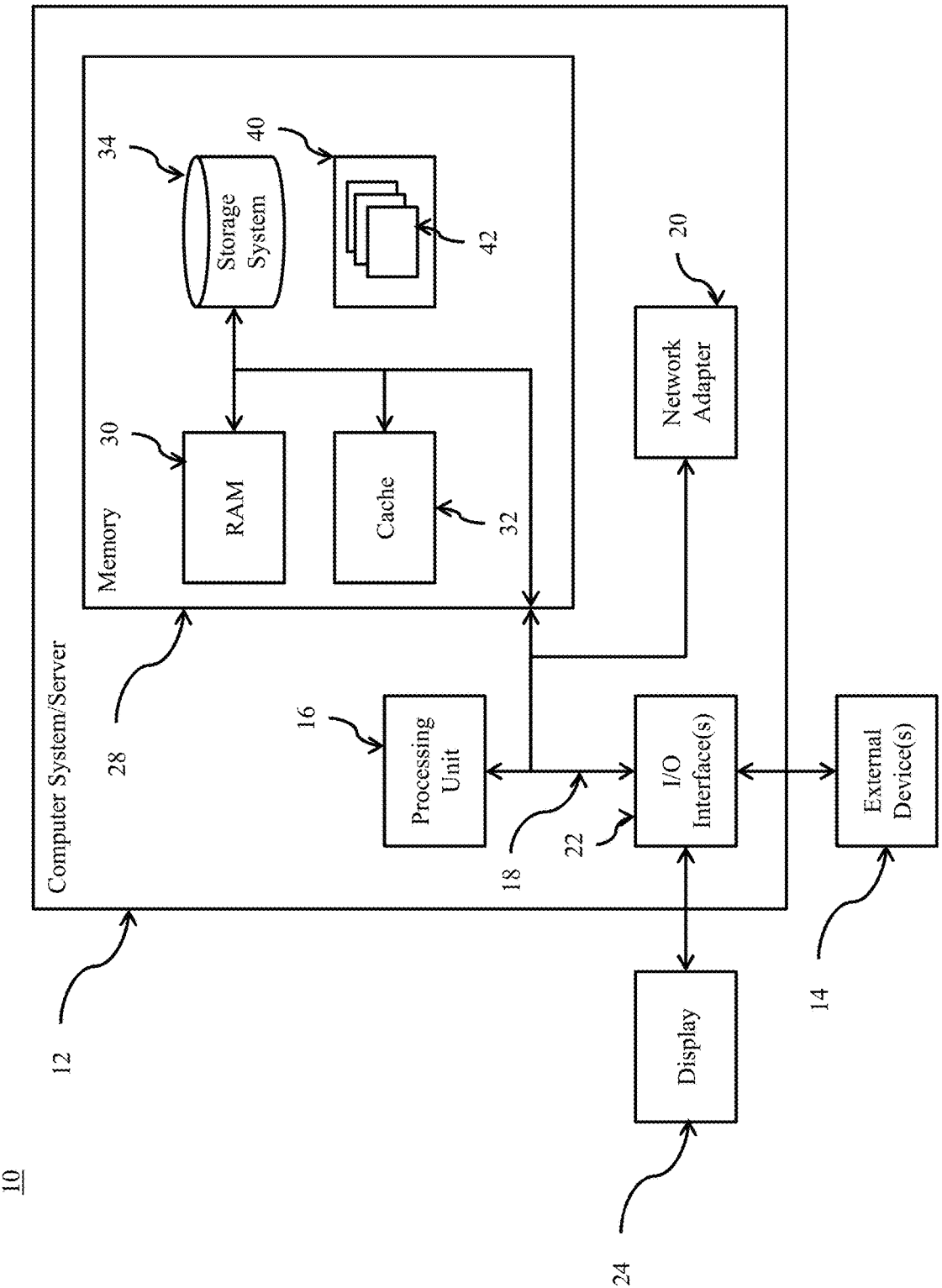
FIG. 13 depicts a computing node according to embodiments of the present disclosure.

Referring now to FIG. 13, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving a request for a tile of geographic data from a requestor, the request specifying a region relative to a projection;
    looking up the region in a spatial index to determine one or more source tiles, the spatial index corresponding to the projection and the one or more source tiles intersecting the region;
    requesting, from a proxy, the one or more source tiles, the proxy being configured to maintain one or more persistent connections to one or more datastores and to retrieve the one or more source tiles via the one or more persistent connections;
    receiving, from the proxy, the one or more source tiles;

constructing, from the one or more source tiles, the requested tile of geographic data; and providing the requested tile of geographic data to the requestor.

2. The method of claim 1, wherein the spatial index is persisted in memory between requests.

3. The method of claim 1, wherein the request further specifies a layer and a date.

4. The method of claim 3, further comprising validating the request.

5. The method of claim 4, wherein validating the request comprises looking up the layer and the date in a database.

6. The method of claim 1, the proxy being further configured to retrieve multiple source tiles in parallel.

7. The method of claim 1, wherein constructing the requested tile of geographic data comprises constructing a mosaic of the one or more source tiles.

8. The method of claim 1, wherein constructing the requested tile of geographic data comprises masking, scaling, and/or applying a color map.

9. The method of claim 8, wherein the request comprises one or more configuration parameters, the one or more configuration parameters specifying the masking, scaling, and or application of a color map.

10. The method of claim 1, wherein constructing the requested tile of geographic data comprises generating an image file.

11. The method of claim 1, further comprising caching the requested tile of geographic data for future requests.

12. The method of claim 1, further comprising caching a predetermined tile in advance of the request.

13. The method of claim 1, wherein the one or more source tiles comprise satellite data and/or one or more agricultural index.

14. The method of claim 1, wherein the one or more source tiles do not conform to the projection, and wherein constructing the requested tile of geographic data comprises projecting the one or more source tiles to the projection.

15. A system comprising:
one or more datastores;
a proxy configured to maintain one or more persistent connections to the one or more datastores;
a computing node comprising a non-transitory computer readable storage medium having program instructions embodied therewith, the program instructions executable by a processor of the computing node to cause the processor to perform a method comprising:
receiving a request for a tile of geographic data from a requestor, the request specifying a region relative to a projection;
looking up the region in a spatial index to determine one or more source tiles, the spatial index corresponding to the projection and the one or more source tiles intersecting the region;
requesting, from the proxy, the one or more source tiles, the proxy being configured to retrieve the one or more source tiles via the one or more persistent connections;
receiving, from the proxy, the one or more source tiles;
constructing, from the one or more source tiles, the requested tile of geographic data; and
providing the requested tile of geographic data to the requestor.

16. A computer program product for dynamic data tiling, the computer program product comprising a non-transitory computer readable storage medium having program instructions embodied therewith, the program instructions executable by a processor to cause the processor to perform a method comprising:
receiving a request for a tile of geographic data from a requestor, the request specifying a region relative to a projection;
looking up the region in a spatial index to determine one or more source tiles, the spatial index corresponding to the projection and the one or more source tiles intersecting the region;
requesting, from a proxy, the one or more source tiles, the proxy being configured to maintain one or more persistent connections to one or more datastores and to retrieve the one or more source tiles via the one or more persistent connections;
receiving, from the proxy, the one or more source tiles;
constructing, from the one or more source tiles, the requested tile of geographic data; and
providing the requested tile of geographic data to the requestor.

17. A method comprising:
receiving a request for availability information of geographic data from a requestor, the request specifying a region relative to a projection;
looking up the region in a spatial index to determine one or more source tiles, the spatial index corresponding to the projection and the one or more source tiles intersecting the region;
requesting, from a proxy, the one or more source tiles, the proxy being configured to maintain one or more persistent connections to one or more datastores and to retrieve the one or more source tiles via the one or more persistent connections;
receiving, from the proxy, the one or more source tiles;
constructing from the one or more source tiles the requested availability information; and
providing the requested availability information to the requestor.

18. The method of claim 17, wherein the spatial index is persisted in memory between requests.

19. The method of claim 17, wherein the request further specifies a layer and a date.

20. The method of claim 19, further comprising validating the request.

21. The method of claim 17, the proxy being further configured to retrieve multiple source tiles in parallel.

22. The method of claim 17, further comprising caching the requested availability information of geographic data for future requests.

23. The method of claim 17, wherein the one or more source tiles comprise satellite data and/or one or more agricultural index.

24. The method of claim 17, wherein the availability information comprises a coverage percentage of the region.

25. The method of claim 17, wherein determining the one or more source tiles comprises substituting an overview image for the one or more source tiles intersecting the region when the one or more source tiles intersecting the region exceed a predetermined maximum.

26. The method of claim 17, wherein constructing the requested availability information comprises analyzing an overall percent of observed, unmasked available data covering a boundary in the one or more source tiles, of executing a Map/Reduce task.

27. A computer program product for determining data layer coverage, the computer program product comprising a non-transitory computer readable storage medium having program instructions embodied therewith, the program instructions executable by a processor to cause the processor to perform a method comprising:
- receiving a request for availability information of geographic data from a requestor, the request specifying a region relative to a projection;
- looking up the region in a spatial index to determine one or more source tiles, the spatial index corresponding to the projection and the one or more source tiles intersecting the region;
- requesting, from a proxy, the one or more source tiles, the proxy being configured to maintain one or more persistent connections to one or more datastores and to retrieve the one or more source tiles via the one or more persistent connections;
- receiving, from the proxy, the one or more source tiles;
- constructing, from the one or more source tiles, the requested availability information; and
- providing the requested availability information to the requestor.

* * * * *